(12) United States Patent
Chen et al.

(10) Patent No.: US 11,923,148 B2
(45) Date of Patent: Mar. 5, 2024

(54) SUBSTRATE-TYPE MULTI-LAYER POLYMER CAPACITOR (MLPC) HAVING ELECTROPLATED TERMINAL STRUCTURE

(71) Applicant: CAPXON ELECTRONIC TECHNOLOGY CO., LTD, Guangdong (CN)

(72) Inventors: Qirui Chen, Shenzhen (CN); I-Chu Lin, Taiwan (CN); Qiwei Chen, Shenzhen (CN)

(73) Assignee: CAPXON ELECTRONIC TECHNOLOGY CO., LTD., Shenzhen (CN)

( * ) Notice: Subject to any disclaimer, the term of this patent is extended or adjusted under 35 U.S.C. 154(b) by 76 days.

(21) Appl. No.: 17/859,160

(22) Filed: Jul. 7, 2022

(65) Prior Publication Data

US 2022/0336152 A1 Oct. 20, 2022

(30) Foreign Application Priority Data

Apr. 18, 2022 (CN) .......................... 202210406254.8
Apr. 18, 2022 (CN) .......................... 202220893887.1

(51) Int. Cl.
  *H01G 9/08* (2006.01)
  *H01G 4/232* (2006.01)
  *H01G 4/30* (2006.01)
  *H01G 9/15* (2006.01)

(52) U.S. Cl.
  CPC ............. *H01G 4/2325* (2013.01); *H01G 4/30* (2013.01); *H01G 9/08* (2013.01); *H01G 9/15* (2013.01)

(58) Field of Classification Search
  None
  See application file for complete search history.

(56) References Cited

U.S. PATENT DOCUMENTS

| 7,126,811 | B2 * | 10/2006 | Hirano | H05K 1/186 |
| | | | | 29/25.03 |
| 9,013,893 | B2 * | 4/2015 | Hsu | H01L 23/50 |
| | | | | 361/763 |
| 11,081,288 | B1 * | 8/2021 | Aoki | H01G 9/15 |
| 11,170,941 | B2 * | 11/2021 | Furukawa | H01G 9/10 |

(Continued)

FOREIGN PATENT DOCUMENTS

| CN | 1637975 A | 7/2005 |
| CN | 105428065 B | 2/2018 |

(Continued)

*Primary Examiner* — Dion R. Ferguson (57) ABSTRACT

A substrate-type multi-layer polymer capacitor (MLPC), including a casing, a core, a first electroplated terminal and a second electroplated terminal. The core is arranged in an inner cavity of the casing. The casing is formed by joining two first packaging plates with two second packaging plates. The first and second electroplated terminals are formed by electroplating. The first electroplated terminal is configured to cover one end of the casing to form an anode electrically led out from the core, and the second electroplated terminal is configured to the other end of the casing to form a cathode electrically led out from the core. The first packaging plate includes a substrate, an electrode plate and two metal plates. The first and second electroplated terminals are integrally sealed with the casing.

5 Claims, 6 Drawing Sheets

(56) References Cited

U.S. PATENT DOCUMENTS

| | | | |
|---|---|---|---|
| 11,244,793 B2* | 2/2022 | Lin | H01G 9/145 |
| 11,626,255 B2* | 4/2023 | Lin | H01G 9/012 |
| | | | 361/330 |
| 11,670,460 B2* | 6/2023 | Suzuki | H01G 9/048 |
| | | | 361/528 |
| 2004/0125543 A1* | 7/2004 | Hirano | H05K 1/186 |
| | | | 361/523 |
| 2004/0174660 A1* | 9/2004 | Arai | H01G 9/042 |
| | | | 361/523 |
| 2012/0262847 A1* | 10/2012 | Kawai | H01G 9/15 |
| | | | 361/540 |
| 2013/0100586 A1* | 4/2013 | Kitayama | H01G 9/012 |
| | | | 29/25.42 |
| 2017/0140877 A1* | 5/2017 | Kuromi | H01G 9/012 |
| 2017/0365419 A1* | 12/2017 | Demizu | H01G 9/15 |
| 2019/0006115 A1* | 1/2019 | Uher | H01G 9/15 |
| 2019/0237266 A1* | 8/2019 | Tsutsumi | H01G 9/10 |
| 2019/0244765 A1* | 8/2019 | Harada | H01G 9/045 |
| 2020/0111621 A1* | 4/2020 | Xiong | H01G 9/0029 |
| 2020/0211784 A1* | 7/2020 | Tamatani | H01G 9/045 |
| 2020/0273628 A1* | 8/2020 | Suzuki | H01G 9/15 |
| 2020/0303130 A1* | 9/2020 | Furukawa | H01G 9/048 |
| 2020/0303131 A1* | 9/2020 | Furukawa | H01G 9/012 |
| 2021/0327651 A1* | 10/2021 | Lin | H01G 9/08 |
| 2021/0383976 A1* | 12/2021 | Tamatani | H01G 4/232 |
| 2022/0336152 A1* | 10/2022 | Chen | H01G 4/30 |

FOREIGN PATENT DOCUMENTS

| | | | | |
|---|---|---|---|---|
| WO | WO-2020174847 A1 * | 9/2020 | | H01G 4/012 |
| WO | WO-2021172236 A1 * | 9/2021 | | H01G 9/0029 |
| WO | WO-2022044939 A1 * | 3/2022 | | H01G 9/025 |
| WO | WO-2022059459 A1 * | 3/2022 | | H01G 9/10 |

* cited by examiner

SUBSTRATE-TYPE MULTI-LAYER POLYMER CAPACITOR (MLPC) HAVING ELECTROPLATED TERMINAL STRUCTURE

CROSS-REFERENCE TO RELATED APPLICATIONS

This application claims the benefit of priority from Chinese Patent Application No. 202220893887.1 and No. 202210406254.8, both filed on Apr. 18, 2022. The content of the aforementioned application, including any intervening amendments thereto, is incorporated herein by reference.

TECHNICAL FIELD

This application relates to capacitors, and more particularly to a substrate-type multi-layer polymer capacitor (MLPC) having an electroplated terminal structure.

BACKGROUND

Capacitor is one of the electronic components intensively used in electronic devices and is an essential component in the circuit. Due to the development of electronic science and technology, electronic devices tend to be high-frequent, miniaturized, and highly-reliable. In a conductive multi-layer polymer capacitor (MLPC), the parallel electrode concept is adopted instead of a traditional winding structure, to achieve low resistance and high capacitance. The MLPC is mainly applied to consumer electronic products. Accompanying the global trend of thinning of the electronic components, the capacitors are required to be thinner, resulting in that the terminal structure of the traditional capacitor formed by bending the lead frame will be limited, and the bending space will be greatly compressed. The terminal structure formed by bending the lead frame may pose restrictions on the thinning tendency of the electronic components, because the bending of the lead frame occupies a certain space, and thus the thickness of the capacitor will be increased, which may hinder the mass production of the thin-type capacitors.

SUMMARY

An object of this disclosure is to provide a substrate-type multi-layer polymer capacitor (MLPC) having an electroplated terminal structure to overcome the defects in the prior art. In the MLPC provided herein, an electroplated terminal structure is configured as a lead-out electrode, which can solve the limitation problem of a traditional terminal formed by bending the lead frame, thinner the MLPC product, and reduce the impedance of the MLPC product. Moreover, the design area of the negative electrode can be maximized, and the electrical capacity and the service life of the MLPC product can be improved.

The technical solutions of the disclosure are described below.

This application provides a substrate-type multi-layer polymer capacitor (MLPC) having an electroplated terminal structure, comprising:
a casing;
a core;
a first electroplated terminal; and
a second electroplated terminal;
wherein the core is arranged in an inner cavity of the casing; the casing is formed by joining a first packaging plate with a second packaging plate; a curing adhesive is filled between a wall of the inner cavity of the casing and an outer surface of the core such that the core is sealedly fixed in the inner cavity of the casing; the first electroplated terminal and the second electroplated terminal are formed by electroplating; the first electroplated terminal is configured to cover one end of the casing to form an anode electrically led out from the core, and the second electroplated terminal is configured to cover the other end of the casing to form a cathode electrically led out from the core; a first surface and a second surface of the core are respectively provided with the first packaging plate; a third surface of the core is provided with the second packaging plate; the first packaging plate comprises a substrate, an electrode plate and two metal plates; the two metal plates are arranged spaced apart in an inner side surface of the first packaging plate; two ends of an outer side surface of the first packaging plate are respectively embedded with the electrode plate; the core is divided by an insulating separator into an anode region and a cathode region; an end of the anode region away from the insulating separator and an end of the cathode region away from the insulating separator are both connected to a conductive adhesive; the conductive adhesive is electrically connected to the first electroplated terminal and the second electroplated terminal; and the first electroplated terminal and the second electroplated terminal are integrally sealed with the casing.

In some embodiments, the number of the first packaging plate is two; two first packaging plates are arranged symmetrically to each other; and the second packaging plate is perpendicularly connected between the two first packaging plates to form the casing.

In some embodiments, a conductive paste is provided in the anode region and the cathode region within the first surface of the core, and is electrically connected to the two metal plates.

In some embodiments, the core is formed by stacking of a plurality of single sheets; the first surface, the second surface and the third surface of the core are respectively filled with the curing adhesive such that the core is integrally sealed with the casing.

In some embodiments, the first and second electroplated terminals are both electrically connected to the electrode plate, the two metal plates, and the conductive adhesive Compared to the prior art, the present disclosure has the following beneficial effects.

(1) The MLPC provided herein can solve the limitation problem of a traditional terminal formed by bending the lead frame, thinner the MLPC, and reduce the impedance of the MLPC. Moreover, the design area of the negative electrode can be maximized, and the electrical capacity and the service life of the MLPC product can be improved.

(2) By arranging the conductive adhesive at the end of the anode region and cathode region, the anode region and cathode region of the core are directly connected to the electroplated terminal. In addition, the anode region and the cathode region are respectively electrically connected to the metal plates arranged at the two ends of the inner side of the first packaging plate through the conductive paste, increasing the lead-out conductive area, and thus providing a better electrical lead and lowering the impedance of the MLPC.

(3) In the MLPC provided herein, the two metal plates are arranged spaced apart in an inner side surface of the first packaging plate, so as to lead out two poles of the core. In addition, the metal plates and the curing adhesive are combined to shield the external resistance to prevent the core from being affected by dampness, thereby prolonging the service life of the MLPC.

(4) In the MLPC provided herein, the metal plates are connected to the core, so as to lead out the heat generated by the core, thereby enhancing the heat dissipation performance of the MLPC.

In the drawings, 1, first packaging plate; 2, second packaging plate; 3, electroplated terminal; 4, core; 5, conductive adhesive; 6, conductive paste; 7, curing adhesive; 101, substrate; 102, electrode plate; 103, metal plate; 301, anode; 302, cathode; 401, insulating separator; 402, anode region; 403, cathode region; 404, first surface; 405, second surface; and 406, third surface.

DETAILED DESCRIPTION OF EMBODIMENTS

The technical solutions in the embodiments of the present disclosure will be clearly and completely described below with reference to the accompanying drawings. Obviously, described below are only some embodiments of the present disclosure, which are not intended to limit the disclosure. The following description is merely illustrative and is not intended to limit the present disclosure and implementation thereof. All other embodiments obtained by one of ordinary skill in the art based on the embodiments provided herein without paying creative efforts shall fall within the scope of the present disclosure.

As used herein, the orientation or positional relationship indicated by the terms (such as "two sides", "upper", "lower", "top", "bottom", "inner", and "outer") are based on the orientation or positional relationship shown in the drawings. Those terms are merely for easy description of the present disclosure and simplifying the description, rather than indicating or implying that the indicated devices or components must have a specific orientation, or are constructed and operated in a specific orientation, and are therefore not to be construed as a limitation of the present disclosure. In the description of the present disclosure, unless otherwise stated, the meaning of "a plurality of" is two or more. In addition, the term "comprising" and any variations thereof are intended to mean "at least comprise".

In the description of the present disclosure, it should be understood that the terms "first", and "second", used herein are for distinguishing, and do not refer to a sequence.

In the description of the present disclosure, unless otherwise stated and defined, the terms "mounted", "connected" and "linked" should be understood broadly, for example, those terms may refer to a fixed connection, a detachable connection, or an integrally formed connection; may refer to a mechanical connection or an electrical connection; may refer to a directly connected or indirectly connected by an intermediate medium; and may refer to a communication between the two components. For one of ordinary skill in the art, the specific meanings of the above terms in the present disclosure can be understood according to specific situations.

As shown in FIGS. 1-9, a substrate-type multi-layer polymer capacitor (MLPC) is provided in an embodiment of the present disclosure, which includes a casing, a core 4, and two electroplating terminals 3. The core 4 is arranged in an inner cavity of the casing. The casing is formed by joining a first packaging plate 1 with a second packaging plate 2. A curing adhesive 7 is filled between a wall of the inner cavity of the casing and an outer surface of the core 4 such that the core 4 is sealedly fixed in the inner cavity of the casing. The electroplated terminals 3 are formed by electroplating. One of the electroplated terminals 3 is configured to cover one end of the casing to form an anode 301 electrically led out from the core 4, and the other of the electroplated terminals 3 is configured to cover the other end of the casing to form a cathode 302 electrically led out from the core 4. A first surface 404 of the core 4 and a second surface 405 of the core 4 are respectively provided with the first packaging plate 1. A third surface 406 of the core 4 is provided with the second packaging plate 2. The first packaging plate 1 includes a substrate 101, an electrode plate 102 and two metal plates 103. The two metal plates 103 are arranged spaced apart in an inner side surface of the first packaging plate 1. Two ends of an outer side surface of each of the two first packaging plates 1 are respectively provided with the electrode plate 102. The core 4 is divided by an insulating separator 401 into an anode region 402 and a cathode region 403. An end of the anode region 402 away from the insulating separator 401 and an end of the cathode region 403 away from the insulating separator 401 is also are both connected to the conductive adhesive 5. The conductive adhesive 5 is electrically connected to the electroplated terminals 3, and the electroplated terminals 3 are integrally sealed with the casing.

Figure 10:
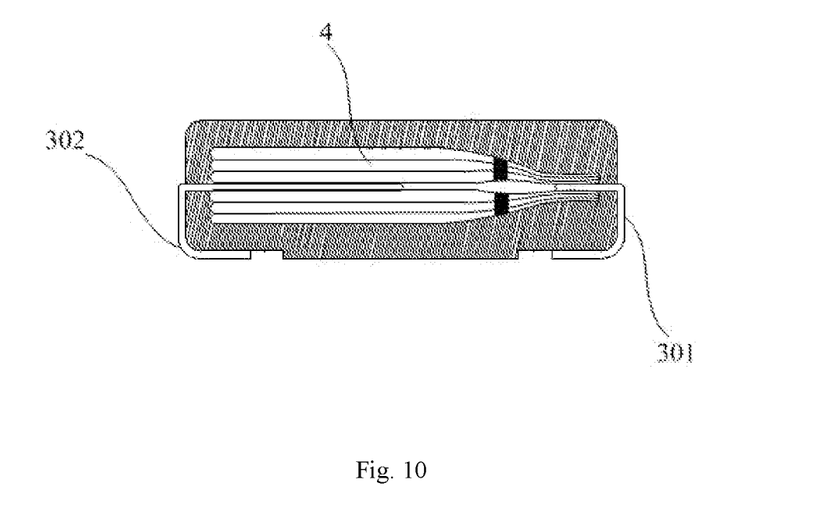
FIG. 10 is a cross-sectional view of a conventional capacitor using a lead frame bending structure as a terminal.

FIG. 10 shows a structure of a conventional capacitor using a lead frame bending structure as a terminal in the prior art. After the terminal is led out of the casing, the terminal needs to be bent and processed, which occupies a certain space, thereby limiting the thinning of the capacitor and hindering the mass production of the lightweight capacitors.

The electroplated terminals 3 prepared by electroplating are not limited in space structure, can be applied to capacitors with different sizes, and also can obtain a thinner anode 301 and cathode 302, which can solve the limitation problem of the bending terminals of a traditional capacitor electrode, thinner the capacitor, and reduce the impedance of the capacitor. Moreover, the design area for the negative electrode can be maximized, and the capacitance and service life of the capacitor can also be improved.

Figure 1:
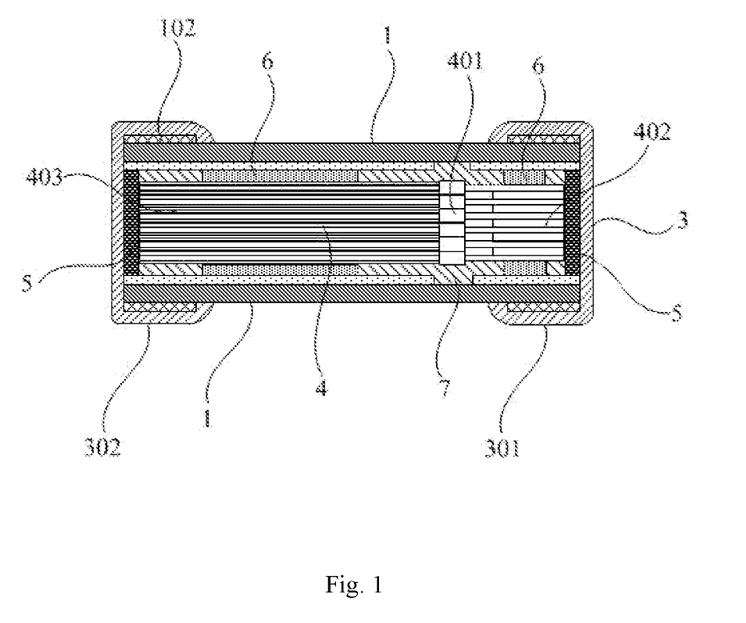
FIG. 1 is a cross-sectional view of a multi-layer polymer capacitor (MLPC) according to an embodiment of the present disclosure.
Figure 2:
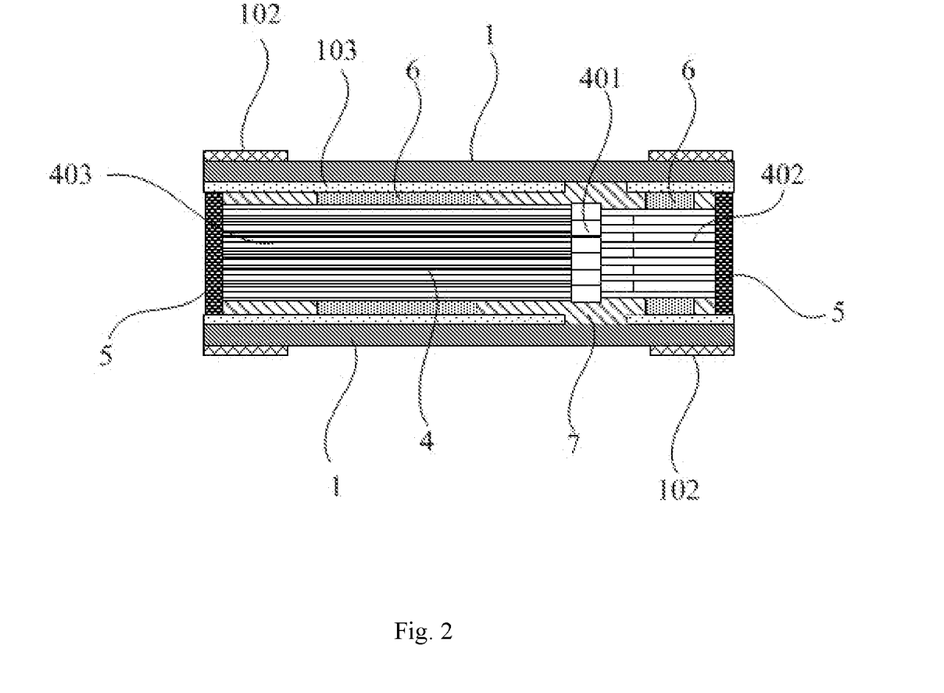
FIG. 2 is a partial cross-sectional view of the MLPC according to an embodiment of the present disclosure.
Figure 3:
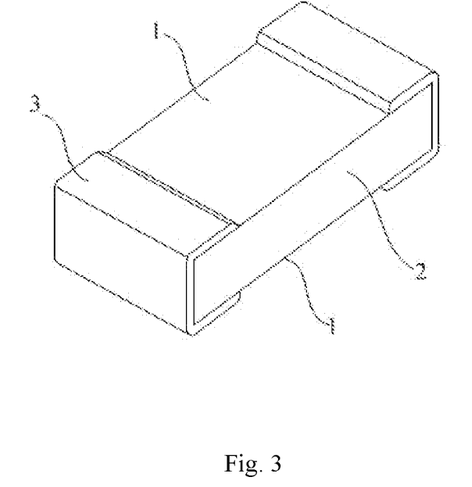
FIG. 3 is a perspective view of the MLPC according to an embodiment of the present disclosure.
Figure 4:
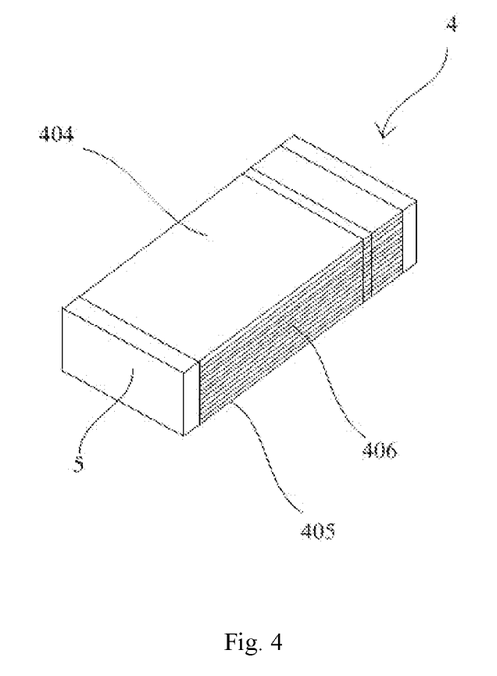
FIG. 4 is a perspective view of a core according to an embodiment of the present disclosure.
Figure 5:
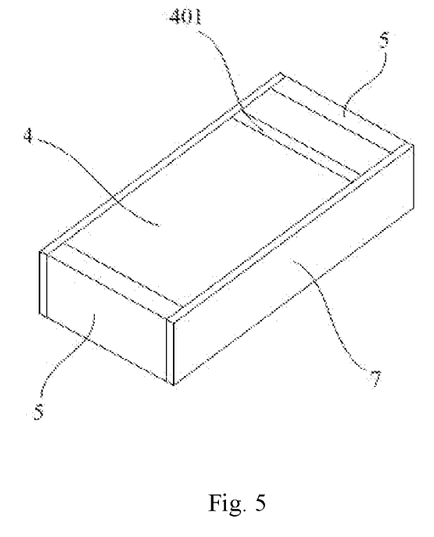
FIG. 5 schematically shows an integrated structure of the core and a curing adhesive according to an embodiment of the present disclosure.
Figure 6:
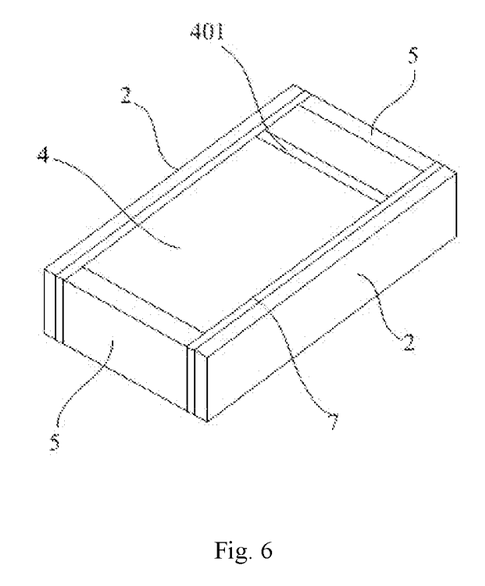
FIG. 6 schematically shows an integrated structure of a second packaging plate and the core according to an embodiment of the present disclosure.
Figure 7:
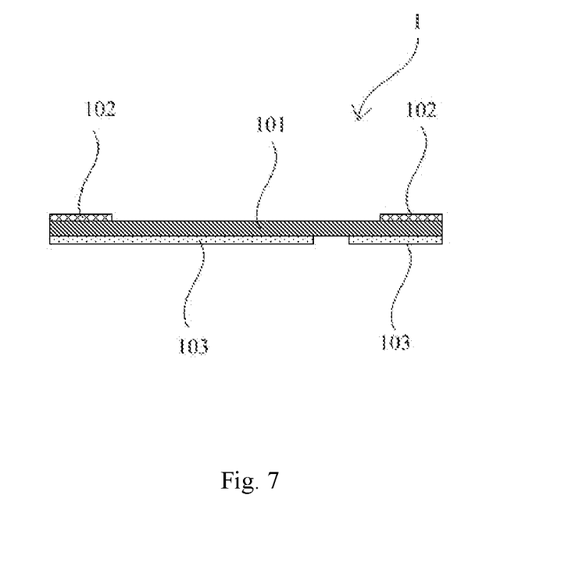
FIG. 7 is a cross-sectional view of a first packaging plate according to an embodiment of the present disclosure.
Figure 8:
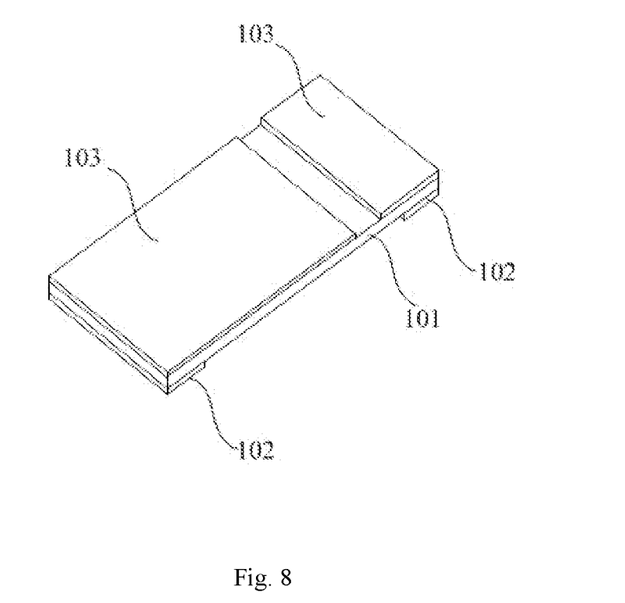
FIG. 8 is a perspective view of the first packaging plate according to an embodiment the present disclosure.
Figure 9:
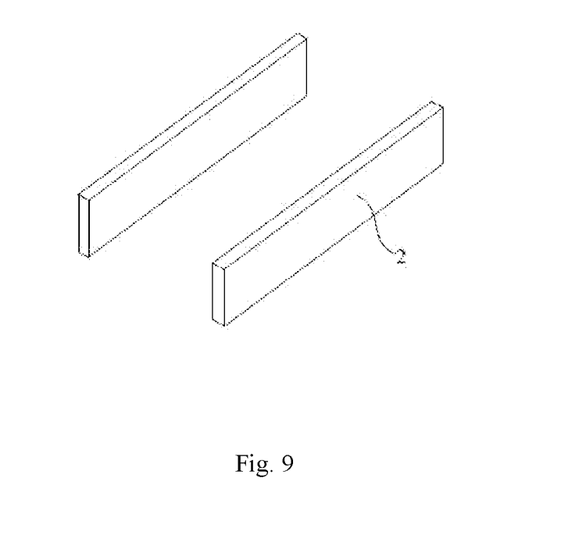
FIG. 9 is a perspective view of the second packaging plate according to an embodiment of the present disclosure.

As shown in FIG. 1, the core 4 is arranged in an inner cavity of the casing. The casing is formed by joining two first packaging plates 1 and two second packaging plate 2.

The two first packaging plate 1 are arranged symmetrically and opposite to each other, and each of the two second packaging plate 2 is perpendicularly connected between the two first packaging plates 1 to form a rectangular casing. In an embodiment, the casing can be an integrated molded body with an inner cavity embedded with the metal plate 103. Each of the two first packaging plates 1 includes a substrate 101, an electrode plate 102 and two metal plates 103. The two metal plates 103 are embedded spaced apart on the inner side surface of the first packaging plate 1. Two ends of an outer surface of each of the first packaging plate 1 are respectively provided with the electrode plate 102. Specifically, the substrate is made of an insulation material and is configured for insulation. The two metal plates 103 are embedded spaced apart on the inner side surface of the first packaging plate 1. The size of each of the two metal plates 103 is matched with the substrate 101, and an end of each of the two metal plates 103 is respectively flush with two ends of the substrate 101. A certain distance is reserved between the two metal plates 103. The two metal plates 103 are configured for shielding and sealing to prevent external water vapor from entering the core 4, and prolonging the service life of the capacitor. Two ends of the outer side surface of the first packaging plate 1 is respectively provided with the electrode plate 102, respectively configured as the electrode plate 102 of the anode and the electrode plate 102 of the cathode. During electroplating, a coating layer is formed on the surface of the electrode plate 102 to wrap the electrode plate 102. The curing adhesive 7 is filled between the wall of the inner cavity of the casing and the outer surface of the core 4 such that the core 4 is sealedly fixed in the inner cavity of the casing. One of the two first packaging plate 1 is provided on the first surface 404 of the core 4, and the other of the two first packaging plate 1 is provided on the second surface 404 of the core 4. One of the two second packaging plates 2 is provided on one of two third surfaces 406 of the core 4, and the other of the two second packaging plates 2 is provided on the other of the two third surfaces 406 of the core 4. The curing adhesive 7 is configured to join the core 4 with the casing and plays a role in sealing and fixing.

A conductive paste 6 is provided in the anode region 402 and the cathode region 403 within the first surface 404 of the core 4, and is electrically connected to the two metal plates 103. Specifically, the anode region 402 and the cathode region 403 within the first surface 404 of the core 4 are respectively provided with a layer of conductive paste 6 such that the anode region 402 and cathode region 403 within the first surface 404 of the core 4 are electrically connected to the metal plate 103 arranged at two ends of the inner side of each of the first packaging plate 1. In this case, the electrode of the core 4 can be led out, and the heat of the core 4 can also be led out owing to a good heat conduction performance of the metal plate 103, so as to improve the heat dissipation performance of the MLPC.

The core 4 is divided into the anode region 402 and the cathode region 403 by the insulating separator 401. An end of the anode region 402 away from the insulating separator 401 and an end of the cathode region 403 away from the insulating separator 401 are both connected to the conductive adhesive 5. The conductive adhesive 5 is electrically connected to the electroplated terminals 3, and the electroplated terminals 3 are integrally sealed with the casing. Specifically, the conductive adhesive 5 is respectively arranged at the end of the anode region 402 and the end of the cathode region 403, where the conductive adhesive 5 is matched with a cross-section of the end of the anode region 402 and a cross-section of the end of the cathode region 403.

The conductive adhesive 5 is configured to lead out the positive and negative electrodes of the core 4. The electroplated terminals 3 generated after the electroplating process are electrically connected to the conductive adhesive 5 to respectively form an exposed anode 301 and a cathode 302.

The electroplated terminals 3 are formed by an electroplating process. The electroplated terminals 3 are electrically connected to the electrode plate 102, the two metal plates 103, and the conductive adhesive 5 to form the anode 301 and the cathode 302 electrically led out from the core 4.

Since the electroplated terminals 3 are respectively formed on two ends of the casing 4 by electroplating, the electroplated terminals 3 are successively connected to the electrode plate 102, the metal plate 103, and the conductive paste 6 to form a metal coating layer, which is not limited by the space. The metal coating layer connects the electrode plate 102, the metal plate 103, the core 4 and the conductive adhesive 5 together to form the anode 301 and the cathode 302 electrically led out from the core 4. The metal coating layer is not restricted by the thickness of the MLPC, and thus the electroplated terminals 3 can be formed at the two ends of the MLPC, which can solve the limitation problem of a traditional terminal formed by bending the lead frame, thinner the MLPC, and reduce the impedance of the MLPC.

It should be emphasized that the embodiments of the present disclosure are illustrative and not restrictive, and the present disclosure is not limited to the embodiments described in the detailed description. Any other embodiments obtained by those skilled in the art according to the technical solutions of the present disclosure shall fall within the protection scope of the present disclosure.

What is claimed is:

1. A substrate-type multi-layer polymer capacitor (MLPC), comprising:
a casing;
a core;
a first electroplated terminal; and
a second electroplated terminal;
wherein the core is arranged in an inner cavity of the casing; the casing is formed by joining a first packaging plate with a second packaging plate; a curing adhesive is filled between a wall of the inner cavity of the casing and an outer surface of the core such that the core is sealedly fixed in the inner cavity of the casing; the first electroplated terminal and the second electroplated terminal are formed by electroplating; the first electroplated terminal is configured to cover one end of the casing to form an anode electrically led out from the core, and the second electroplated terminal is configured to cover the other end of the casing to form a cathode electrically led out from the core; a first surface and a second surface of the core are respectively provided with the first packaging plate; a third surface of the core is provided with the second packaging plate; the first packaging plate comprises a substrate, an electrode plate and two metal plates; the two metal plates are arranged spaced apart in an inner side surface of the first packaging plate; two ends of an outer side surface of the first packaging plate are respectively embedded with the electrode plate; the core is divided by an insulating separator into an anode region and a cathode region; an end of the anode region away from the insulating separator and an end of the cathode region away from the insulating separator are both connected to a conductive adhesive; the conductive adhesive is electrically connected to the first electroplated terminal and the second electroplated terminal;

and the first electroplated terminal and the second electroplated terminal are integrally sealed with the casing.

2. The substrate-type MLPC of claim 1, wherein the number of the first packaging plate is two; two first packaging plates are arranged symmetrically and opposite to each other; and the second packaging plate is perpendicularly connected between the two first packaging plates to form the casing.

3. The substrate-type MLPC of claim 1, wherein a conductive paste is provided in the anode region and the cathode region within the first surface of the core, and is electrically connected to the two metal plates.

4. The substrate-type MLPC of claim 1, wherein the core is formed by stacking of a plurality of single sheets; the first surface, the second surface and the third surface of the core are respectively filled with the curing adhesive such that the core is integrally sealed with the casing.

5. The substrate-type MLPC of claim 1, wherein the first electroplated terminal and the second electroplated terminal are both electrically connected to the electrode plate, the two metal plates, and the conductive adhesive.

\* \* \* \* \*